Patented Feb. 17, 1948

2,436,256

UNITED STATES PATENT OFFICE 2,436,256

PROCESS FOR POLYMERIZING ETHYLENE

William E. Hanford, Easton, Pa., and Paul L. Salzberg, Wilmington, Del., assignors to E. I. du Pont de Nemours & Company, Wilmington, Del., a corporation of Delaware No Drawing. Application April 21, 1944, Serial No. 532,208

7 Claims. (Cl. 260—94)

This invention relates to improvements in polymerization processes. The polymerization processes with which this invention is concerned include polymerization of ethylene alone and co-polymerization or interpolymerization of ethylene with other substances. Included also are those polymerizations of ethylene wherein the end groups of the polymer are supplied by a non-polymerizable reactant.

Hitherto, ethylene polymers have been prepared by various processes, such as by polymerization at pressures in excess of 500 atmospheres and in the presence of oxygen or oxygen-yielding substances as catalysts. These processes are disclosed in U. S. Patents 2,153,553, 2,188,465 and 2,200,429. Furthermore, it has been known that, in the polymerization of ethylene, anhydrous reaction systems may be employed to prevent hydrolysis of one or more of the polymerizable ingredients, as taught in the Hanford application, S. N. 383 554, filed March 15, 1941, now Patent No. 2,396,785.

In some instances serious difficulties have been encountered in conducting the polymerization of ethylene in anhydrous solvents in the presence of peroxide or oxygen-yielding substances. For example, the polymerization frequently exhibited long induction periods, and produced polymers of relatively low molecular weight.

An object of this invention is to prepare polymerization products either from ethylene alone, or from ethylene and other substances, without the use of peroxides or oxygen-yielding catalysts. Another object is to provide a process for the preparation of high molecular weight ethylene polymers in anhydrous media. Still another object is to prepare improved ethylene polymerization products.

These and other objects are accomplished in accordance with this invention by polymerization of ethylene in the presence of a positive halogen-containing compound as catalyst. In one of its specific embodiments this invention contemplates heating ethylene, with or without a second polymerizable or copolymerizable compound, in the presence of an anhydrous solvent and a positive halogen compound at superatmospheric pressure, to give polymeric products. The process of the present invention may also be employed advantageously in the preparation of ethylene polymers wherein the end groups are supplied by a non-polymerizable ingredient. This latter type of reaction, which has been termed "telomerization," is described in the copending application of Hanford and Joyce, S. N. 438,466, filed April 10, 1942.

Oxygen, or oxygen containing gas such as air, is generally detrimental to ethylene polymerization reactions except when present in very minute amounts, and, in the practise of this invention, precautionary steps are taken to prevent or minimize inclusion of oxygen. For example, in charging the reaction vessel, the catalyst and solvent may be introduced under a blanket of inert gas, such as nitrogen.

Since ethylene is a gas at ordinary temperatures and pressures, it is preferable to operate the process of the present invention at pressures above atmospheric to obtain satisfactory rates of reaction. In one specific embodiment the process may be conducted by introducing ethylene into an agitated reaction vessel containing the catalyst, and thereafter heating the vessel to a temperature in the range of from 50° to 400° C. Additional ethylene may then be injected until the desired pressure is reached. Heating and agitation of the reaction vessel is continued for several hours during which time the utilization of ethylene may be followed by observing the decrease in pressure. As the reaction proceeds the pressure may be maintained within the desired range by periodic injection of ethylene. After completion of reaction, the reaction mixture is discharged and the polymerization product is recovered therefrom.

The temperatures used in the practise of this invention are within the range of from about 50° to 400° C., generally from 100° to 350° C., and preferably from 200° to 250° C. The reaction is generally conducted at a pressure of from 1 to 3000 atmospheres, preferably about 200 to 1500 atmospheres, although much higher pressures may be employed, the upper limit being determined solely by the strength of available equipment. Pressures and temperatures are interdependent variables, i. e., the higher pressures make possible the use of lower reaction temperatures. Conversely, at low pressures relatively higher reaction temperatures are necessary to produce a polymer of a given molecular weight. Variation of ethylene pressure affords a means of control of molecular weight of the products prepared in accordance with this invention. Generally, in preparing polymers of ethylene in accordance with this invention it is preferred to operate at the lowest temperature which will give practical rates of reaction.

The ethylene polymerization reactions which, in accordance with this invention, are catalyzed by positive-halogen compounds do not ordinarily exhibit the induction periods which frequently are observed with many vinyl polymerizations, as customarily carried out with conventional types of catalysts. The products which are obtained by the process of this invention are shown by the following examples to be superior to products which hitherto have been obtained by polymerization of ethylene in the presence of oxygen or oxygen-yielding catalysts (cf. Plastics, 7, 531–32, 1943).

In the examples to follow the polymerizations are carried out in reaction vessels of 400 volume units capacity, and the parts given are by weight in c. g. s. units unless otherwise stated. These examples illustrate the preparation of ethylene polymers (which term embraces polymers from ethylene alone, or from ethylene and other polymerizable materials, as well as ethylene ploymers containing end groups supplied by non-polymerizable reactants) in accordance with several different embodiments of this invention.

*Example 1.*—A pressure - resistant vessel is charged with 50 parts of sodium bisulfite, 120 parts of water, 30 parts of isoöctane, and 2 parts of sodio N-chloro-p-toluene sulfonamide. The vessel is then closed, evacuated to remove residual air, and placed in a heated shaker machine. The vessel is pressured with ethylene and heating and agitation are started. During a reaction period of 10.25 hours, throughout which the pressure is maintained at 850 to 960 atmospheres and the temperature at 118° to 120° C., there is a total observed pressure drop of 90 atmospheres. The vessel is then cooled, bled of unreacted ethylene, opened, and the contents discharged. The isoöctane and water are evaporated and there is thus obtained 65 parts of a water-soluble sodium sulfonate. This solid is covered with methanol and saturated with hydrogen chloride. The resultant sodium chloride is removed by filtration and the methanol filtrate evaporated to dryness in vacuum. This yields 36 parts of a sulfonic acid which has a neutral equivalent of 128. This corresponds to an average composition of $$H(CH_2)_{3.3}SO_3H$$

*Example 2.*—A stainless steel - lined reaction vessel is charged with 0.4 part of calcium hypochlorite, 0.5 part of borax and 100 parts (by volume) of tertiary butyl alcohol. The vessel is then closed, placed in a heated shaker machine, pressured with ethylene, and heating and agitation are started. During a reaction time of 12.4 hours, throughout which pressure is maintained at 800 to 975 atmospheres and the temperature at 184° to 194° C., there is a total observed pressure drop of 735 atmospheres. The vessel is then cooled, bled of unreacted ethylene, opened, and the contents discharged. The reaction mixture is steam distilled to separate the tertiary butyl alcohol and the residual magma is then filtered and washed thoroughly to remove salts, after which the polymer is dried. There is thus obtained 59.8 parts of polyethylene which can be readily pressed into attractive films and spun into fibers or filaments.

*Example 3.*—A stainless steel-lined reactor is charged with 0.5 part sodio N-chloro-p-toluene sulfonamide and 100 parts by volume of tertiary butyl alcohol. The procedure of Example 1 is repeated and during a reaction time of 14 hours, throughout which the pressure is maintained at 840 to 1000 atmospheres and the temperature at 150° C., there is a total observed pressure drop of 270 atmospheres. The product is isolated as in Example 1 and there is obtained 42 parts of polyethylene which has the following properties:

| | |
|---|---|
| Intrinsic viscosity | 0.98 |
| Tensile at break (based on original dimensions) lbs./sq. in. | 2,650 |
| Elongation at break (based on original dimensions) per cent | 510 |
| Stiffness lbs./sq. in. | $0.023 \times 10^6$ |
| Elastic modulus dynes/sq. cm. | $0.19 \times 10^{10}$ |
| Softening point (block Macquenne) °C | 89 |

*Example 4.*—A stainless steel - lined pressure resistant vessel is charged with 25 parts of methyl methacrylate, 59 parts of tertiary butyl alcohol, and 0.2 part sodio N-chloro-p-toluene sulfonamide. The vessel is evacuated, placed in a shaker machine, pressured with ethylene, and heating and agitation are begun. The total observed pressure drop over a total reaction time of 9.25 hours, during which the temperature is maintained at 135° to 138° C. and the pressure at 865 to 950 atmospheres, is 330 atmospheres. At the end of the reaction the vessel is cooled, bled of excess ethylene, opened, and the product discharged. The tertiary butyl alcohol is removed after which the polymer is dried on a smooth roll mill at 100° C. There is thus obtained 15 parts of a tough, clear, homogeneous ethylene/methyl methacrylate copolymer having a carbon content of 64.54% from which it may be calculated that the ethylene/methyl methacrylate mole ratio is 1.2:1. The relative viscosity of a ½% solution in xylene is 1.2456 from which it may be calculated that the intrinsic viscosity of the copolymer is 0.36. The copolymer is readily pressed into films at 85° C. and these are found to have a tensile strength of 2070 lbs./sq. in. and an elongation of 180%, both figures being based on original dimensions.

*Example 5.*—A silver-lined pressure-resistant vessel is charged with 0.3 part of sodio N-chloro-p-toluene sulfonamide, 20 parts of dimethyl fumarate, and 100 parts (by volume) of tertiary butyl alcohol. The reactor is closed, placed in a shaker machine and pressured with ethylene and heating and agitation are started. During a reaction time of 14 hours, throughout which the pressure is maintained at 850 to 950 atmospheres and the temperature at 150° to 161° C., there is a total observed pressure drop of 250 atmospheres. At the end of the reaction the vessel is cooled, bled of excess ethylene, opened, and the reaction mixture discharged. The tertiary butyl alcohol and the small amount of unreacted dimethyl fumarate are removed by steam distillation and the polymer is separated from water and dried on a smooth roll mill at 100° C. There is thus obtained 32 parts of an ethylene/dimethyl fumarate copolymer which has an intrinsic viscosity of 0.19 and which, by analysis, has an ethylene/dimethyl fumarate mole ratio of 3.06:1. This is a clear, completely homogeneous rubberlike polymer.

*Example 6.*—A silver-lined high pressure reactor is charged with 200 parts of propionic anhydride and 0.3 part of sodio N-chloro-p-toluene sulfonamide. The vessel is closed, evacuated, and placed in a shaker machine. The vessel is pressured with ethylene and heating and agitation are started. During a reaction time of 12.5 hours, throughout which the temperature is maintained at 197° to 207° C. and the pressure at 760 to 970 atmospheres, the observed pressure drop totals 550 atmospheres. The vessel is then cooled, bled of excess ethylene and the contents discharged. The reaction mixture, which amount to 242 parts, is diluted with 300 parts of water and 300 parts of ethyl alcohol. This is heated on a steam bath to hydrolyze and alcoholize the anhydride, and the water, alcohol, and ethyl propionate are evaporated. The residue amounts to 54 parts and comprises a soft paste which is completely soluble in dilute alkalies. Such alkaline solutions form strong, stable foams and wet sulfur readily. On analysis the product is found to have an acid number of 161.1, corresponding to a molecular weight of 348, a saponification number of 146, a molecular weight (ebull.) of 382 and an iodine number of 1.2. Correlation of these data shows that the product consists substantially of high molecular weight fatty acids.

*Example 7.*—A silver-lined high-pressure reactor is charged with 0.5 part of sodio N-chloro-p-toluene sulfonamide, 25 parts of styrene and 75 parts (by volume) of tertiary butyl alcohol. The reactor is closed, placed in a shaker machine and pressured with ethylene. During a reaction period of 8.75 hours, throughout which the pressure is maintained at 850 to 950 atmospheres and the temperature at 189° to 193° C., there is a total observed pressure drop of 190 atmospheres. The vessel is cooled, bled of unreacted ethylene, opened, and the reaction mixture discharged. The tertiary butyl alcohol is separated by steam distillation and the remaining polymer is washed free of salt and dried. There is thus obtained 29 parts of a resin.

*Example 8.*—A stainless steel-lined, pressure-resistant vessel is swept free of air with deoxygenated nitrogen, charged with 0.2 part of sodio-N-chloro-p-toluene sulfonamide, closed, and evacuated. The vessel is then placed in a heated shaker machine, connected to a source of ethylene, and pressured with ethylene to 100 atmospheres. Heating and agitation are started and during a reaction period of 15.25 hours, throughout which the temperature is maintained at 170 to 182° C. and the pressure at 850 to 1000 atmospheres, there is a total observed pressure drop of 80 atmospheres. At the end of the reaction the vessel is cooled, bled of unreacted ethylene, opened and the reaction mixture discharged. The solid product is then washed with water until free of salts and dried. This yields 6 parts of a strong, tough ethylene polymer which has an intrinsic viscosity of 0.8 (0.25% solution in xylene at 85° C.). The polymer can be pressed to clear tough films which can be readily cold-drawn.

The positive halogen compounds which may be used as catalysts in accordance with this invention are the compounds in which halogen has a positive valency. Such halogen compounds hydrolyze in dilute alkali to give hypohalites rather than the corresponding halides, which are normal hydrolysis products obtained from halogen compounds. Suitable specific examples of such positive halogen compounds include inorganic hypohalites such as calcium hypochlorite; N-haloaryl sulfonamides, for example, sodio N-chloro-p-toluene sulfonamide and sodio N-chlorobenzene sulfonamide or potassium analogues thereof; N-haloamides such as 1,3-dichloro-5,5-dimethylhydantoin, N-chlorourea, 1-chloro-5,5 - dialkylhydrantoins; N - haloalkane sulfonamides, such as N,N-dichlorobutane sulfonamide, sodio N-chlorohexane sulfonamide; and chlorine.

In certain instances it is found advisable to use an adjuvant which can be considered an activator or catalyst aid. An example of this is the use of borax or other alkaline substance such as the alkali metal borates, phosphates and carbonates which, in aqueous systems, would have an alkaline buffering action. Such substances possibly operate by promoting the activity of the catalyst or by absorbing any chlorine that may be liberated from the catalyst. The amount of catalyst, based on the polymerizable monomers, may be as low as 0.0001% but the catalyst is preferably used in amounts ranging from 0.001% to 1% although even 5 or 10% of catalysts may be used.

While it is not necessary to use solvents for conducting the reactions of this invention, it may be convenient to do so. Organic solvents which are free of secondary or tertiary hydrogens are frequently preferred. Solvents containing secondary or tertiary hydrogens may be employed, particularly if the solvents are highly branched and the secondary or tertiary hydrogens are sterically hindered. Representative compounds fulfilling these conditions are benzene, toluene, chlorobenzene, isooctane, methyl tertiary-butyl ether, pentamethylethane, methyl pivolate, pivalone and pivaloin.

As compounds which are nonpolymerizable and noncopolymerizable with ethylene, there may be used a wide variety of substances. These appear to act so that the end result is the addition of two complementary fragments of the compound to the ends of a chain of ethylene, or ethylene and polymerizable compound, units. For example, with carbon tetrachloride and ethylene the reaction product consists entirely of compounds of the structure $Cl(CH_2CH_2)_nCCl_3$, where n is a whole integer having an average value greater than two. Broadly, the substances which may be used in this fashion include esters of organic hydroxylic compounds with inorganic acids such as carbon tetrachloride, chloroform, chloroiodomethane, silicon tetrachlorate, dimethyl, diethyl, and higher dialkyl sulfates, alkyl acid sulfates, bromoform, iodoform, methylene bromide and other halogenated methanes; water-soluble sulfites, such as sodium bisulfite, sodium sulfite; many other organic compounds, particularly oxygenated organic compounds free of olefinic unsaturation and containing only carbon, hydrogen and oxygen and preferably containing a secondary or tertiary hydrogen. Most suitable compounds of the latter type are the simple aliphatic esters, anhydrides, ethers and acetals. Specific examples include methyl and ethyl and higher propionates and butyrates, methyl, ethyl and higher isobutyrates, isopropyl, secondary butyl, and higher secondary alkyl alkanoates, propionic anhydride, butyric anhyride, isobutyric anhydride, diethyl ether, dibutyl ether, pentamethylene oxide, 1,4-dioxane, 1,3-dioxane, 1,3-dioxolane, methylal, acetal, and other acetals.

In preparing copolymers of ethylene, any polymerizable or copolymerizable compound may be used. By way of example of a wide variety of such substances, there may be mentioned other olefins such as propylene, isobutylene, butadiene, methylenecyclohexane, and isoprene; vinyl ethers, esters and ketones, such as vinyl methyl ether, vinyl ethyl ether, vinyl butyl ether, vinyl formate, vinyl acetate, vinyl propionate, vinyl isobutyrate, vinyl valerate, vinyl trimethylacetate, vinyl diethylacetate, vinyl laurate, vinyl stearate, methyl vinyl ketone, ethyl vinyl ketone; haloalkenes such as vinyl fluoride, vinyl chloride, vinyl bromide, 2-chloropropene-1, 2-chloro-1,3- butadiene, vinylidene fluoride, vinylidene chloride; esters, amides, and nitriles of acrylic and alpha-alkacrylic acids such as methyl, ethyl, propyl, butyl and higher acrylates and methacrylates, N-alkyl- and N,N-dialkylacrylamides and methacrylamides, acrylonitrile, and methacrylonitriles; esters, amides and nitriles of unsaturated acids such as methyl and ethyl maleate, fumarate, itaconate and citraconate; bis-(N,N-dimethyl) fumaramide, -maleamide, -itaconamide and -citraconamide; maleonitrile, fumaronitrile, itaconitrile, citracononitrile.

It is desirable that the ethylene which is used in the practice of this invention be relatively free of impurities. Small amounts of hydrocarbons or inert gases may however be tolerated.

The reaction may be conducted either batchwise or continuously. In the continuous process tubular type units may be employed, and in this embodiment of the invention it is generally desirable to employ somewhat higher temperatures than in the batch process.

The process of this invention may be conducted in any suitable equipment of sufficient strength to withstand the temperatures and pressures employed. Such equipment is preferably made of or lined with relatively inert materials such as stainless-steel, silver, lead, tin, enamel, or glass. Ordinarily high tensile steels may be employed, although it may be necessary to condition the surface which comes in contact with the reactants, for example, by a thorough cleansing with diluted hydrogen peroxide, or by conducting a peroxide-catalyzed reaction therein for some time, or by highly polishing such a surface. The reaction vessel should be equipped with suitable equipment for agitation of the reactants such as by stirrers or shaking machines. In the tubular type reactors, agitation may be achieved by introducing the reactants under conditions of turbulent flow. Other suitable methods of agitating include atomization and efficient bubbling of the gas phase through the liquid phase of the reaction mixture. In the continuous process, the reactants or the catalysts may be introduced at several points throughout the reaction zone.

Since many apparently widely differing embodiments of this invention may be made without departing from the spirit and scope thereof, it is to be understood that we do not limit ourselves except as set forth in the following claims.

We claim:

1. A process for preparing ethylene polymers which consists in subjecting ethylene under oxygen-free conditions at a temperature in the range of 100° to 350° C. at a pressure within the range of 200 to 3000 atmospheres to the action of a catalyst containing positive halogen, said catalyst being of the group consisting of hypochlorites and substances which yield hypochlorites on hydrolysis with dilute alkali.

2. A process for preparing ethylene polymers which comprises subjecting ethylene under oxygen-free conditions at a temperature in the range of 100° to 350° C. and at a pressure within the range of 200 to 1500 atmospheres to the action of a catalyst containing positive halogen, said catalyst being of the group consisting of hypochlorites and substances which yield hypochlorites on hydrolysis with dilute alkali, whereby a polymer having polymerized ethylene as the sole polymerized ingredient is produced, and thereafter separating the said polymer from the resulting mixture.

3. A process for preparing ethylene polymers which comprises subjecting ethylene under oxygen-free conditions at a temperature in the range of 200° to 250° C. and at a pressure within the range of 200 atmospheres to 3000 atmospheres to the action of a catalyst containing a positive halogen, said catalyst being of the group consisting of hypochlorites and substances which yield hypochlorites, on hydrolysis with dilute alkali, whereby a polymer having polymerized ethylene as the sole polymerized ingredient is produced, and thereafter separating the said polymer from the resulting mixture.

4. A process for preparing ethylene polymers which consists in subjecting ethylene under oxygen-free conditions at a temperature in the range of 200° to 250° C. and at a pressure within the range of 200 to 1500 atmospheres to the action of a catalyst containing positive halogen, said catalyst being of the group consisting of hypochlorites and substances which yield hypochlorites on hydrolysis with alkali.

5. A process for preparing ethylene polymers which consists in subjecting ethylene under oxygen-free conditions at a temperature in the range of 200° to 250° C. and at a pressure within the range of 200 to 1500 atmospheres to the action of a calcium hypochlorite catalyst, whereby an ethylene polymer is produced.

6. A process for preparing ethylene polymers which consists in subjecting ethylene under oxygen-free conditions at a temperature in the range of 200° to 250° C. in an inert reaction medium at a pressure within the range of 200 to 1500 atmospheres to the action of a sodio-N-chloro-p-toluene sulfonamide catalyst, whereby ethylene polymer is produced.

7. A process for preparing ethylene polymers which consists in subjecting ethylene under oxygen-free conditions at a temperature in the range of 200° to 250° C. in an inert reaction medium at a pressure within the range of 200 to 1500 atmospheres to the action of a catalyst consisting of calcium hypochlorite and a buffer of the class of alkali metal borates, phosphates and carbonates, whereby ethylene polymer is produced.

WILLIAM E. HANFORD.
PAUL L. SALZBERG.

REFERENCES CITED

The following references are of record in the file of this patent:

UNITED STATES PATENTS

| Number | Name | Date |
|---|---|---|
| 2,123,599 | Fikentscher | July 12, 1938 |
| 2,200,429 | Perrin | May 14, 1940 |
| 2,334,195 | Hopff | Nov. 16, 1943 |
| 2,340,109 | D'Alelio | Jan. 25, 1944 |
| 2,342,400 | Hopff | Feb. 22, 1944 |